United States Patent [19]

Sur

[11] Patent Number: 5,842,774
[45] Date of Patent: Dec. 1, 1998

[54] DEVICE FOR ADJUSTING BRIGHTNESS OF BRAKE LAMPS

[75] Inventor: Kwang-Hyug Sur, Suwon, Rep. of Korea

[73] Assignee: Hyundai Motor Company, Seoul, Rep. of Korea

[21] Appl. No.: 982,477

[22] Filed: Dec. 2, 1997

[30] Foreign Application Priority Data

Dec. 2, 1996 [KR] Rep. of Korea ...................... 96-61092

[51] Int. Cl.[6] .................................................. F21Y 11/00
[52] U.S. Cl. ............................ 362/284; 340/479; 362/61; 362/276; 362/324
[58] Field of Search ........................... 362/61, 83.3, 276, 362/279, 284, 324, 325, 802; 340/479, 467

[56] References Cited

U.S. PATENT DOCUMENTS 5,258,895 11/1993 Bosse ....................................... 362/281
5,317,487 5/1994 Su ........................................... 362/80.1

*Primary Examiner*—Stephen F. Husar
*Attorney, Agent, or Firm*—Birch, Stewart, Kolasch & Birch, LLP

[57] ABSTRACT

A device as disclosed for automatically adjusting the brightness of a brake lamp which has a bulb mounted to the central portion of a reflector and a lens attached to the outer edges of the reflector. The device includes a hinge pin transversely mounted to the inside surface of the lens and a plate hinged to said pin, said plate having a curved shape corresponding to the inside surface of the lens and a plurality of holes, and adapted for normally closing the upper portion of the lens and selectively opening the lens with an inertia force acting on an automobile. Also, the device further comprises a weight mounted to the upper end of the plate for selectively opening the plate so as to increase the brightness of the brake lamp and an elastic member mounted to the hinge pin for normally biasing the plate so as to elastically return the plate to its original position.

3 Claims, 3 Drawing Sheets

DEVICE FOR ADJUSTING BRIGHTNESS OF BRAKE LAMPS

BACKGROUND OF THE INVENTION

1. Field of the Invention

The present invention relates, in general, to brake lamps for vehicles and, more particularly, to a device for automatically adjusting the brightness of such a brake lamp in accordance with a braking operation.

2. Description of the Prior Art

As well known to those skilled in the art, brake lamps of automobiles inform the driver of a following automobile of a braking operation of a leading automobile when the driver of the leading vehicle steps on a brake pedal. Such a brake lamp is automatically turned on in response to the operation of a brake lever of a brake system. In FIG. 1, an example of such a brake lamp is schematically illustrated. As shown in FIG. 1, a bulb 2 is mounted in the central portion of a reflector 1, while a lens 3 is attached to the outer edges of the reflector 1. Thus, both direct light from the bulb 2 and reflected light from the reflector 1 are projected to the rear from the brake lamps of the automobile through the lens 3. The color of the projected light is determined by the color of the lens 3.

A driver frequently steps on the brake pedal while driving an automobile. The operation of such a brake pedal will be explained below. In a normal state, in which the driver knows the traffic conditions around his automobile, the driver can slowly and safely step on the brake pedal. However, in a state of emergency, the driver has to quickly and strongly step on the brake pedal.

Therefore, typical brake lamps are problematic in that they have fixed brightness. That is, when the driver of a leading automobile suddenly and quickly steps on the brake pedal, a following automobile may collide with the rear of the leading automobile since the brake lamps of the leading automobile, with such a fixed brake light brightness, fail to allow the driver of the following automobile to effectively operate his brake system and avoid such a collision. Therefore, typical brake lamps may cause traffic hazards such as a collision in the event of such an emergency braking operation.

SUMMARY OF THE INVENTION

Accordingly, the present invention has been made in view of the above problems occurring in the prior art, and thus an object of the present invention is to provide a device for automatically adjusting the brightness of a brake lamp in accordance with an inertia force of the automobile in the event of a braking operation, thereby allowing the driver of a following automobile to distinguish the emergency braking operation of a leading automobile from a normal braking operation and to effectively operate his braking system to avoid a collision.

In order to accomplish the above object, the present invention provides a device for automatically adjusting the brightness of a brake lamp of an automobile, comprising a bulb mounted to the central portion of a reflector and a lens attached to the outer edges of said reflector, and further comprising: a hinge pin transversely mounted to the inside surface of the lens; a plate hinged to said pin, said plate having a curved shape corresponding to the inside surface of said lens and having a plurality of holes, and adapted for normally closing the upper portion of said lens and selectively opening said lens with an inertia force acting on the automobile; a weight mounted to the upper end of said plate for selectively opening the plate so as to increase the brightness of said brake lamp; an electromagnet mounted to the upper portion of the inside surface of said reflector; an ECU connected to said electromagnet for controlling the magnetic force of said electromagnet; a plurality of sensors connected to said ECU for sensing the speed characteristics of the automobile; and an elastic member mounted to said hinge pin for normally biasing said plate so as to elastically return the plate to its original position.

BRIEF DESCRIPTION OF THE DRAWINGS

The above object, and other features and advantages of the present invention will be more clearly understood from the following detailed description taken in conjunction with the accompanying drawings, in which.

DESCRIPTION OF THE PREFERRED EMBODIMENT

Figure 1:
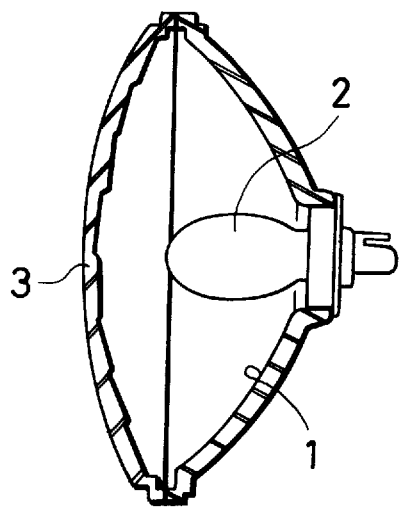
FIG. 1 is a schematically cross-sectional view of a brake lamp according to the prior art.
Figure 2:
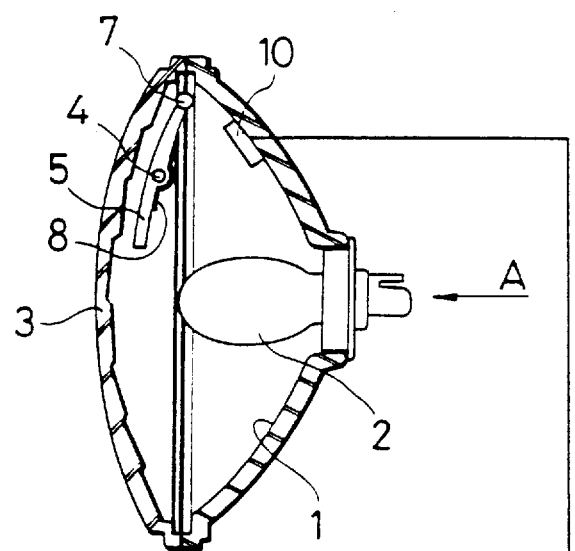
FIG. 2 is a block diagram of a device for adjusting the brightness of a brake lamp in accordance with a preferred embodiment of the present invention.
Figure 2:
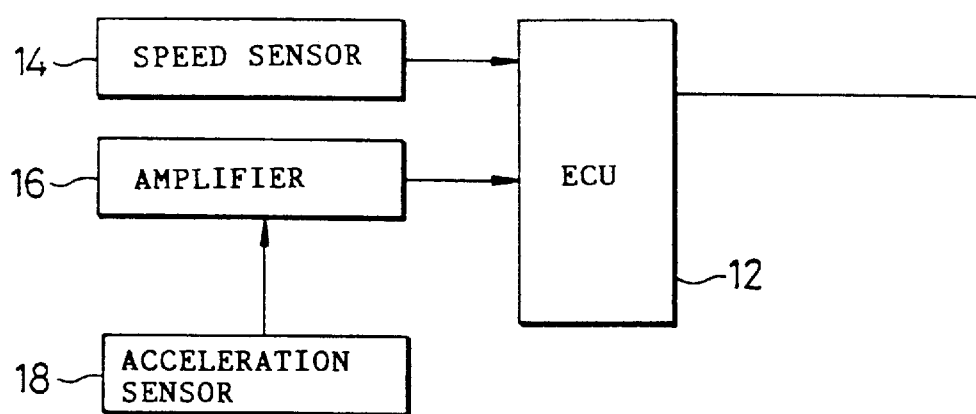
Figure 3:
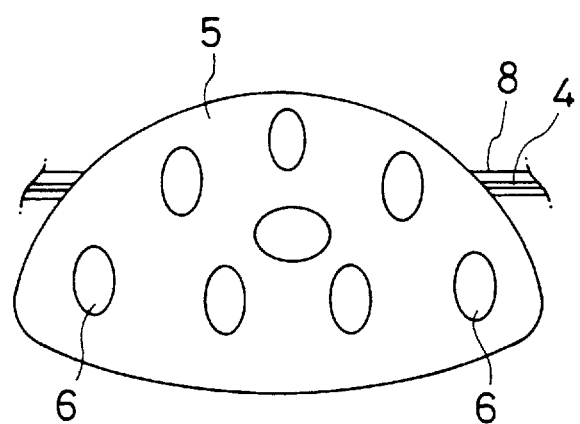
FIG. 3 is a front view of a device for adjusting the brightness of a brake lamp according to FIG. 2.

FIGS. 2 and 3 schematically show the construction of a device for automatically adjusting the brightness of a brake lamp according to a preferred embodiment of the present invention.

As shown in FIGS. 2 and 3, a bulb 2 is mounted to the central portion of a reflector 1, while a lens 3 is attached to the outer edges of the reflector 1. A hinge pin 4 is transversely mounted to the inside surface of the lens 3. A rotatable plate 5 is hinged to the pin 4 in such a manner that the lens 3 is partially covered with the plate 5. The plate 5 has a curved shape corresponding to the inside surface of the lens 3. Also, a plurality of holes 6 are formed on the plate 5. A weight 7 is mounted to the upper end of the plate 5.

The plate 5 may be rotated around the pin 4 in a direction toward the front of an automobile due to the weight 7. However, a torsion spring 8 is mounted to the pin 4, thereby preventing the plate 5 from being rotated. As shown in FIGS. 2 and 3, the lower end of the plate 5 is normally directed to the rear direction of the automobile.

As shown FIG. 2, an electromagnet 10, which is connected to an ECU (electronic control unit) 12, is mounted to the upper portion of the inside surface of the reflector 1. A speed sensor 14, used for sensing the speed of the automobile, is connected to the ECU 12. Also, an acceleration sensor 18, used for sensing the acceleration of the automobile, is connected to the ECU 12 via an amplifier 16.

The function of the light adjusting device according to the preferred embodiment of the present invention is described below. When a driver slowly and softly steps on the brake pedal (not shown) while driving the automobile, the magnetic force of the electromagnet 10 is controlled by an electrical signal from the ECU 12. The electrical signal is changed by both the speed sensor 14 and the acceleration sensor 18 which may be operated by the stepping force of the pedal.

In this case, the light of the brake lamps is projected to the rear from the brake lamps of the automobile through both the holes 6 of the plate 5 and a portion of the lens 3, which is exposed to the bulb 2.

When the driver quickly and strongly steps on the brake pedal while driving an automobile, the weight 7 leans to the front of the automobile by an inertia force. As a result, the upper end of the plate 5 is moved to the front of the automobile while twisting the torsion spring 8. Accordingly, the lens 3 is opened widely, thus allowing the light of the brake lamp to be brightly projected to the rear of the automobile. Thereafter, the plate 5 is returned to its original position by the restoring force of the torsion spring 8.

In a brief description, the more quickly the driver steps on the brake pedal, the further the plate 5 leans to the front of the automobile. That is, when the driver quickly and strongly steps on the brake pedal, the light of the brake lamp is more brightly projected in the rear direction of the automobile. Also, when the driver slowly and softly steps on the brake pedal, the brake lamp lights more faintly.

As mentioned above, the device for automatically adjusting brightness of a brake lamp in accordance with the present invention has a configuration in which a rotatable plate is hinged to the inside surface of a lens by a hinge pin with a weight being mounted to the upper end of the plate. Thus, the brightness of the brake lamp can be adjusted by the movement of the weight according to the stepping force of the brake pedal. Therefore, the driver of a following automobile can more easily recognize the braking situation of a leading automobile, thereby preventing traffic accident from occurring.

Although the preferred embodiments of the present invention have been disclosed for illustrative purposes, those skilled in the art will appreciate that various modifications, additions and substitutions are possible, without departing from the spirit and scope of the invention as disclosed in the accompanying claims.

What is claimed is:

1. A device for automatically adjusting brightness of a brake lamp of an automobile, comprising a bulb mounted to the central portion of a reflector and a lens attached to the outer edges of said reflector, further comprising:

a hinge pin transversely mounted to the inside surface of said lens;

a plate hinged to said pin, said plate having a curved shape corresponding to the inside surface of said lens and having a plurality of holes, and adapted for normally closing the upper portion of said lens and selectively opening said lens with an inertia force acting on the automobile;

a weight mounted to the upper end of said plate for selectively opening the plate so as to increase brightness of said brake lamp;

an electromagnet mounted to the upper portion of the inside surface of said reflector;

an ECU connected to said electromagnet for controlling a magnetic force of said electromagnet;

a plurality of sensors connected to said ECU for sensing speed characteristics of the automobile; and an elastic member mounted to said hinge pin for normally biasing said plate so as to elastically return the plate to its original position.

2. The device as claimed in claim 1, wherein said sensors comprise a speed sensor and an acceleration sensor.

3. The device as claimed in claim 2, wherein said acceleration sensor is connected to said ECU via an amplifier.

* * * * *